(12) United States Patent
Bird et al.

(10) Patent No.: US 8,150,961 B1
(45) Date of Patent: Apr. 3, 2012

(54) SYSTEMS AND METHODS FOR UPDATING DISTRIBUTED NETWORK INVENTORY SERVICES

(75) Inventors: Mark Bird, Highland, UT (US); Scot Swan, Mapleton, UT (US)

(73) Assignee: Crimson Corporation, Dover, DE (US)

( * ) Notice: Subject to any disclaimer, the term of this patent is extended or adjusted under 35 U.S.C. 154(b) by 833 days.

(21) Appl. No.: 11/289,130

(22) Filed: Nov. 29, 2005

(51) Int. Cl.
*G06F 15/173* (2006.01)
*G06F 15/16* (2006.01)

(52) U.S. Cl. ......................... 709/224; 709/219

(58) Field of Classification Search .................... 709/226
See application file for complete search history.

(56) References Cited

U.S. PATENT DOCUMENTS

| | | | |
|---|---|---|---|
| 5,881,243 A * | 3/1999 | Zaumen et al. ............... | 709/241 |
| 6,806,813 B1 | 10/2004 | Cheng et al. | |
| 6,968,373 B1 * | 11/2005 | Norris et al. .................. | 709/223 |
| 7,225,241 B2 * | 5/2007 | Yada ........................... | 709/223 |
| 2003/0084145 A1 * | 5/2003 | Ramachandran et al. .... | 709/224 |
| 2006/0047810 A1 * | 3/2006 | Herzog et al. ................ | 709/224 |

OTHER PUBLICATIONS

"Inventory Software", pp. 1-2, http://www.alchemy-lab.com/products/atn/, Oct. 12, 2006.
"Integrated Report Generation, Software and hardware inventory reports", pp. 1-2, http://www.kaseya.com/prod1/reports.phtml, Oct. 12, 2006.

* cited by examiner

*Primary Examiner* — Ian N Moore
*Assistant Examiner* — Afshawn Towfighi
(74) *Attorney, Agent, or Firm* — Austin Rapp & Hardman (57) ABSTRACT

Systems and methods for updating distributed network inventory services are disclosed. A network or a portion thereof is scanned to identify at least one computing asset within the scanned portion. A scan file is compiled based on the information obtained. A first inventory service is updated based on the scan file. A second inventory service is identified. The scan file is transmitted to the second inventory service, and the second inventory service is updated based on the scan file. In one embodiment, the inventory services are selectively updated based on specific types of data, such as hardware or software inventory data, within the scan file. In addition, a specialized database management system may be used to enable data gathering techniques specific to inventory data.

16 Claims, 8 Drawing Sheets

Fig. 8 ial cast to invention's scope, the exemplary embodi-

SYSTEMS AND METHODS FOR UPDATING DISTRIBUTED NETWORK INVENTORY SERVICES

TECHNICAL FIELD

The present invention relates generally to computers and computer-related technology. More specifically, the present invention relates to systems and methods for updating distributed inventory services within a network.

BACKGROUND

Computer technologies continue to advance at a rapid pace. Indeed, computers are used in almost all aspects of business, industry and academic endeavors. Improvements in computer technologies have been a force for bringing about great increases in business and industrial productivity. More and more homes are using computers as well.

There are many different kinds of computers in use today. The term "computer system" will be used herein to refer generally to any device or combination of devices that is capable of processing information to produce a desired result. Some examples of computer systems include personal computers, hand-held computers, personal digital assistants (PDAs), servers, mainframes, supercomputers, minicomputers, workstations, microcomputers, microcontrollers, and the like.

The use of computer networks is prevalent in both homes and workplaces. Computer systems within a computer network may easily communicate with each other and share resources, such as printers and hard disk storage devices. Unfortunately, when a network is quite large, managing computing assets (i.e., hardware and software) can become extraordinarily cumbersome. In particular, it can be very difficult to determine what assets are included within the network. For example, if a network is large, it may be very difficult to determine whether all computer systems within the network have installed anti-virus software and whether the anti-virus software is up-to-date such that the network is secure against most types of virus attacks.

Fortunately, inventory systems have been developed that gather and organize inventory data in an automated fashion. The inventory services may assist a network administrator in determining which computer systems or software components of computer systems need to be upgraded or updated.

Some inventory services may be distributed throughout various locations within a network to allow ease of access. For example, the inventory services may be positioned at various servers within a network. Updating these distributed inventory services such that they contain the most recent inventory data can be cumbersome and can require significant network resources to perform this task. Furthermore, when the inventory data is stored at various locations, security can become an issue in that unauthorized parties may access the inventory information. In addition, the distributed inventory services often contain redundant information that is not needed at each server.

Accordingly, benefits may be realized by improved systems and methods for updating distributed inventory services. Some exemplary systems and methods for updating distributed network inventory services are described herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

A method for updating distributed inventory services that enumerate computing assets within a computer network is disclosed. At least a portion of a network is scanned to inventory computing assets within the portion of the network. An inventory scan file is compiled that reflects at least one computing asset within the portion of the network. A first inventory service running on a first server is updated based on the inventory scan file. An address of a second server running a second inventory service is identified. The inventory scan file is transmitted to the second server. The second inventory service is updated based on the inventory scan file.

In one embodiment, the first inventory service comprises a first type of data, and updating the first inventory service comprises selectively updating the first type of data based on the inventory scan file. The first type of data comprises, for example, an inventory of software computing assets or an inventory of hardware computing assets.

In a particular embodiment, the second inventory service comprises a second type of data, and updating the second inventory service comprises selectively updating the second type of data based on the inventory scan file. In such an embodiment, access to the second inventory service may be limited.

The first server, in one embodiment, is associated with a first set of computing assets, and the second server is associated with a second set of computing assets. The inventory service may comprise a database management system created specifically for inventory services to enable specialized inventory data gathering. The specialized inventory data gathering technique may comprise a breadcrumb feature that identifies which server is associated with a particular computing asset, and may further comprise a hashing function that groups computing assets according to the server which is associated with each asset.

A system configured to implement the methods described above is also disclosed. The system includes a first and a second server in electronic communication with each other. The servers comprise or may be in electronic communication with a non-transitory computer-readable medium comprising instructions to implement the methods described above. A non-transitory computer-readable medium, independent of the disclosed system, comprising executable instructions for implementing the methods described above is also disclosed.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

In this specification, numerals are used to describe the various components shown in the drawings. If there are multiple different examples of the same component, a letter may be shown in the drawing after the numeral. For example, servers 105 may be shown in the drawings as server 105a, server 105b, etc. and described as "servers 105" in the specification. This principle applies to all of the components described herein.

Figure 1:
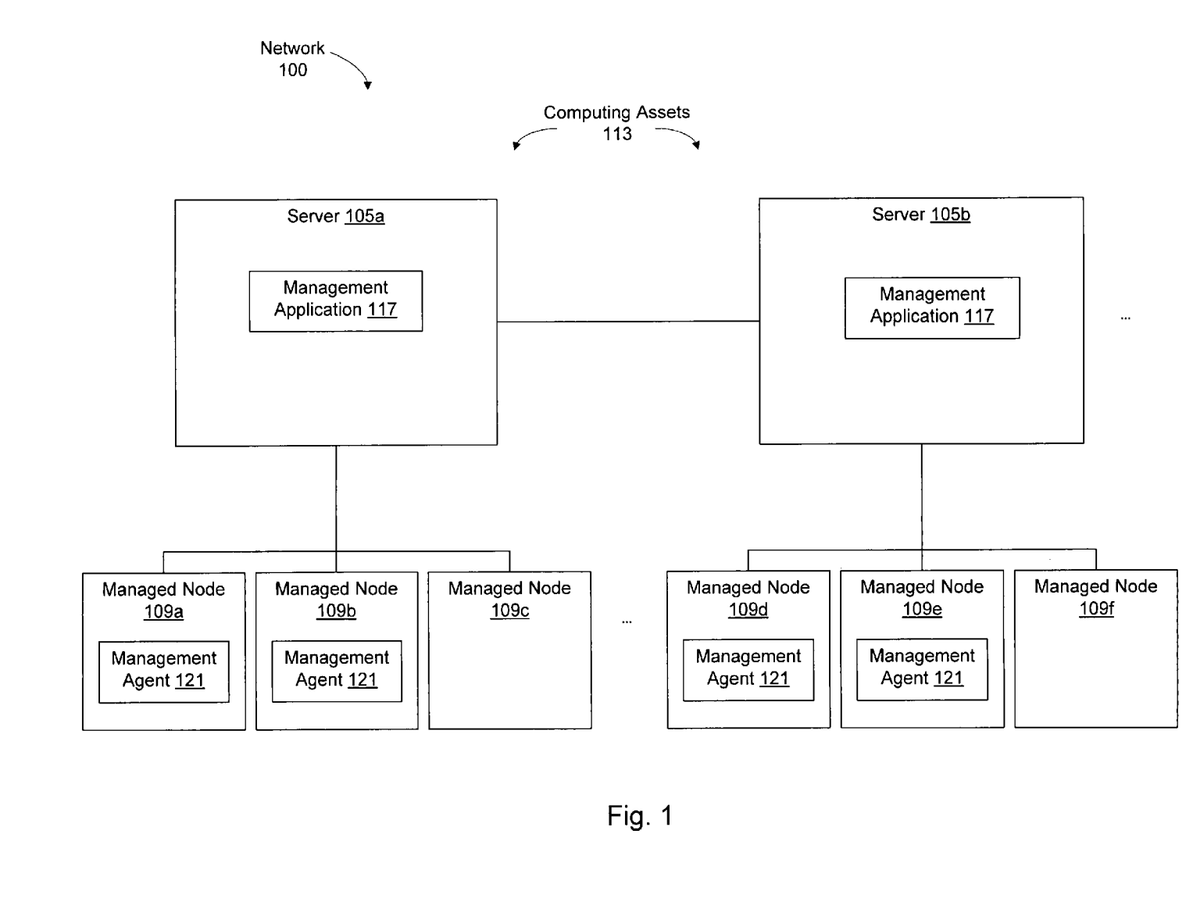
FIG. 1 is a block diagram illustrating one embodiment of a network in which a system for updating distributed inventory services may be implemented.

FIG. 1 is a block diagram illustrating one embodiment of a network 100 having multiple servers 105 that manage nodes 109 within the network 100. As will be explained in greater detail below, embodiments of systems and methods for updating distributed inventory services may be implemented in connection with such a network 100.

The server 105 in FIG. 1 is a computer system or a group of computer systems which may be used to store and retrieve data accessed by nodes 109 within the network 100. The server 105 can also manage network traffic and provide access to shared resources, such as printers and scanners. The server 105, together with a router, may also act as a gateway to other networks, such as the Internet.

The server 105 may be embodied in a wide variety of different configurations. The server 105 is not limited to a computer system using a specific type of hardware or operating system. For example, the server 105 may use Windows® Server 2003 or Windows XP, both of which are produced by Microsoft Corporation of Redmond, Wash. Alternatively, by way of example, the server 105 could also use UNIX, Linux or other operating systems.

Nodes 109 within the network 100 may be embodied in a wide variety of different configurations. For example, the nodes 109 may comprise a desktop computer system, a personal data assistant (PDA) with networking capabilities, a tablet PC, a notebook or laptop computer, a printer, a scanner, a router, a hub, a switch, or a multi-function peripheral (printer/scanner/copier/fax machine).

The depicted network 100 may be embodied in a wide variety of configurations and may include portions of one or more networks 100. The network 100 may include, for example, a local area network (LAN), storage area networks (SANs), metropolitan area networks (MANs), wide area networks (WANs), satellite networks, other types of wireless networks, and/or combinations thereof (e.g., the Internet). A variety of different network configurations and network protocols may be used, including Ethernet, TCP/IP, UDP/IP, IEEE 802.11, IEEE 802.16, Bluetooth, asynchronous transfer mode (ATM), fiber distributed data interface (FDDI), token ring, and so forth, including combinations thereof. Of course, some embodiments may also be practiced with conventional point-to-point connections, such as enterprise systems connection (ESCON), small computer system interface (SCSI), fibre channel, etc., that may not typically be viewed as a "network."

As indicated above, multiple servers 105 may be utilized to manage the nodes 109. Each of the servers 105 may manage, or be associated with, a particular set of computing assets 113, that may include nodes 109. The depicted network 100 includes two servers 105. In other embodiments, of course, more than two servers 105 may be used. Similarly, although each depicted network server 105 manages three nodes 109, a server 105 may manage, for example, one node 109 or hundreds of nodes 109.

In one embodiment, a management application 117 running on a server 105a-b may be in communication with a management agent 121 on certain managed nodes 109a-c, 109d-f to enable management of the nodes 109a-c, 109d-f. Managing nodes 109 from one or more centralized locations can provide significant advantages. For example, management applications and agents 117, 121 can facilitate and/or automate remote installation of software (including software packages and updates) on managed nodes 109 and can even facilitate or automate migration of a managed node 109 to a new operating system. The management agent 121 may determine the hardware and software configuration of a managed node 109 and can optionally transmit this data to an associated management application 117. In addition, the management agent 121 may determine what software licenses are available for a particular node 109 or whether the currently installed software is properly licensed. The management application 117 may also enable remote diagnosis and resolution of computing issues. One or more of the foregoing management tasks may be performed, for example, by LANDesk® Security Suite, LANDesk® Patch Manager, LANDesk® Management Suite, LANDesk® Instant Support Suite Pro, or LANDesk® Inventory Manager produced by LANDesk Software, Inc., of South Jordan, Utah. The management agent 121, optionally working together with the management application 117, can significantly reduce the time and expense required to manage computing assets 113 within a network 100.

Not every managed node 109, however, is running a management agent 121. For example, a managed node 109 may include a printer, router, switch, or scanner, which is generally not equipped to run a management agent 121. Accordingly, the computing assets 113 may include a wide variety of different devices.

Figure 2:
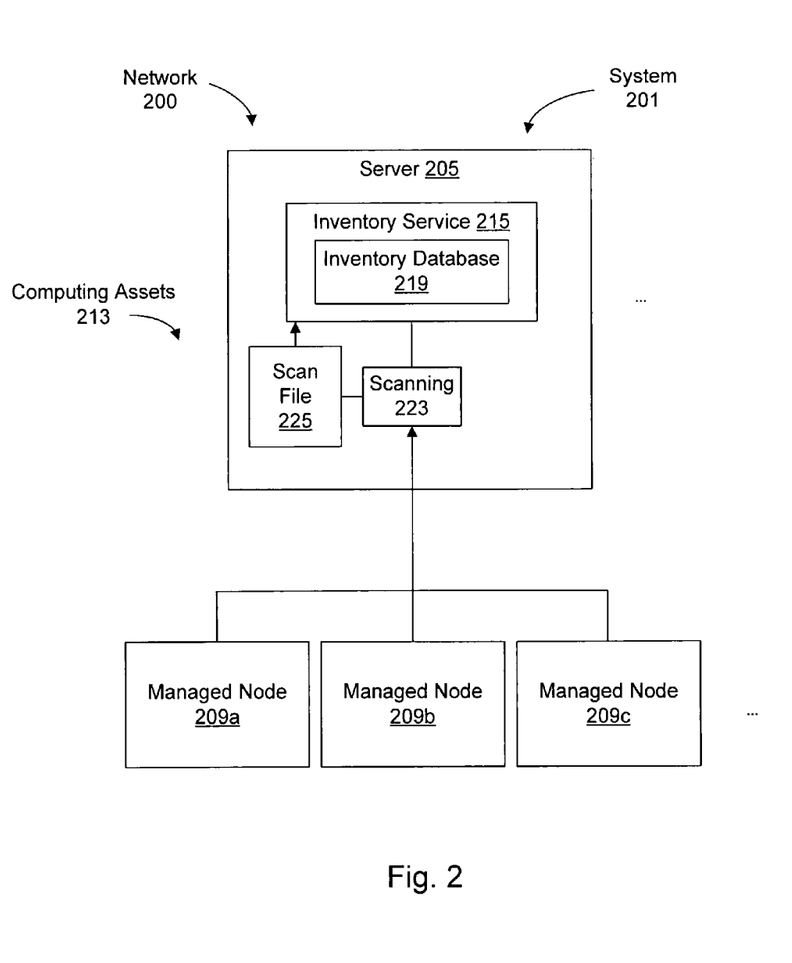
FIG. 2 is a block diagram illustrating a network including one embodiment of a system for updating an inventory service for a network.

FIG. 2 is a block diagram illustrating a network 200 that includes one embodiment of a system 201 for updating inventory data for computing assets 213 within the network 200. The network 200 includes a server 205 and managed nodes 209. The system 201 includes an inventory service 215 having an inventory database 219 and a scanning component 223 that produces scan files 225.

The inventory service 215 may be integrated with, or comprise a portion of, the management application 117, which is shown in FIG. 1. Alternatively, the inventory service 215 may be an independent application or process from the management application 117. In one embodiment, when the inventory service 215 is an independent application, the inventory service 215 may interact or communicate with the management application 117 or one or more management agents 121 (shown in FIG. 1). In one embodiment, the inventory service 215 may run on a server 205 that does not utilize a management application 117.

As noted, the inventory service 215 includes an inventory database 219. The database 219 maintains data comprising an inventory of the computing assets 213 within the network 200 or a portion thereof. The database 219 may include, for example, data identifying software and/or hardware assets. The inventory database 219 may include data related to the version numbers or types of software, firmware, or hardware used on managed nodes 209.

This data can be very valuable because a network administrator may use the data to determine whether hardware or software for a particular node 209 needs to be upgraded. For example, a network administrator may use this data to determine whether anti-virus or other security software needs to be updated on managed nodes 209 and which nodes 209 require these updates. A network administrator could additionally use this data to quickly determine which computer systems have the slowest processors and thus are next-in-line to be upgraded. This inventory data can save significant amounts of administrative time because the network administrator is not required to manually gather this information.

The inventory database 219 may use a wide variety of different database management systems. As will be explained in connection with FIG. 6, in one embodiment, a database management system specially created for an inventory system is utilized.

The scanning component 223 may comprise hardware and/or software for producing, or compiling, a scan file 225. The scanning component 223 may be a separate component from the inventory service 215, as shown in FIG. 2, or may be integrated with the inventory service 215. The scanning component 223 may include or communicate with management agents 121 or other types of software (shown in FIG. 1) running on each managed node 209 or may run directly from the server 205 to inventory computing assets 213. In one embodiment, a scanning component 223 resides on each node 209. The scanning component 223 may be part of a login script so that it runs every time a person logs into the node 209. Alternatively, scanning may occur based on a "local scheduler" which runs on each managed node 209 and performs a scan at scheduled intervals. In another embodiment, the server 205 transmits instructions to a managed node 209 to begin scanning. The scanning component 223 may use, for example, a mixture of Win32, DMI, and CIM APIs, and BIOS calls to gather data. In one embodiment, the resulting data is formatted in a proprietary grammar and transferred to a server 205. The scanning component 223 may save a copy of the latest hardware/software scan locally on a node 209. A "delta scan" file 225 is then generated that shows changes that will be reported to the server 205. Sending a delta scan file 225 greatly decreases the amount of data that is transmitted across the network 200. Transmission control protocol ("TCP") transfer protocol, or other techniques or methods, may be used to transfer a scan file 225 created at a node 209 to a server 205.

The scan file 225 comprises either incremental or complete inventory data for the network 200 or a portion thereof. For example, a scan file 225 may include updated or incremental data about changes in software or hardware configuration of the managed nodes 209 since the last scan was performed. In one embodiment, the scanning component 223 constantly monitors the managed nodes 209 for hardware or software changes and creates a scan file 225 when a change is made. If an initial scan of the network 200 is being conducted, the scan file 225 comprises a complete listing of the computing assets 213 within the network 200 or a portion of the network 200 being scanned. In one embodiment, the inventory database 219 includes information regarding the hardware and software configuration of the server 205. When a scan file 225 has been compiled, the inventory database 219 may be updated to provide the most recent inventory information on the network 200.

Figure 3:
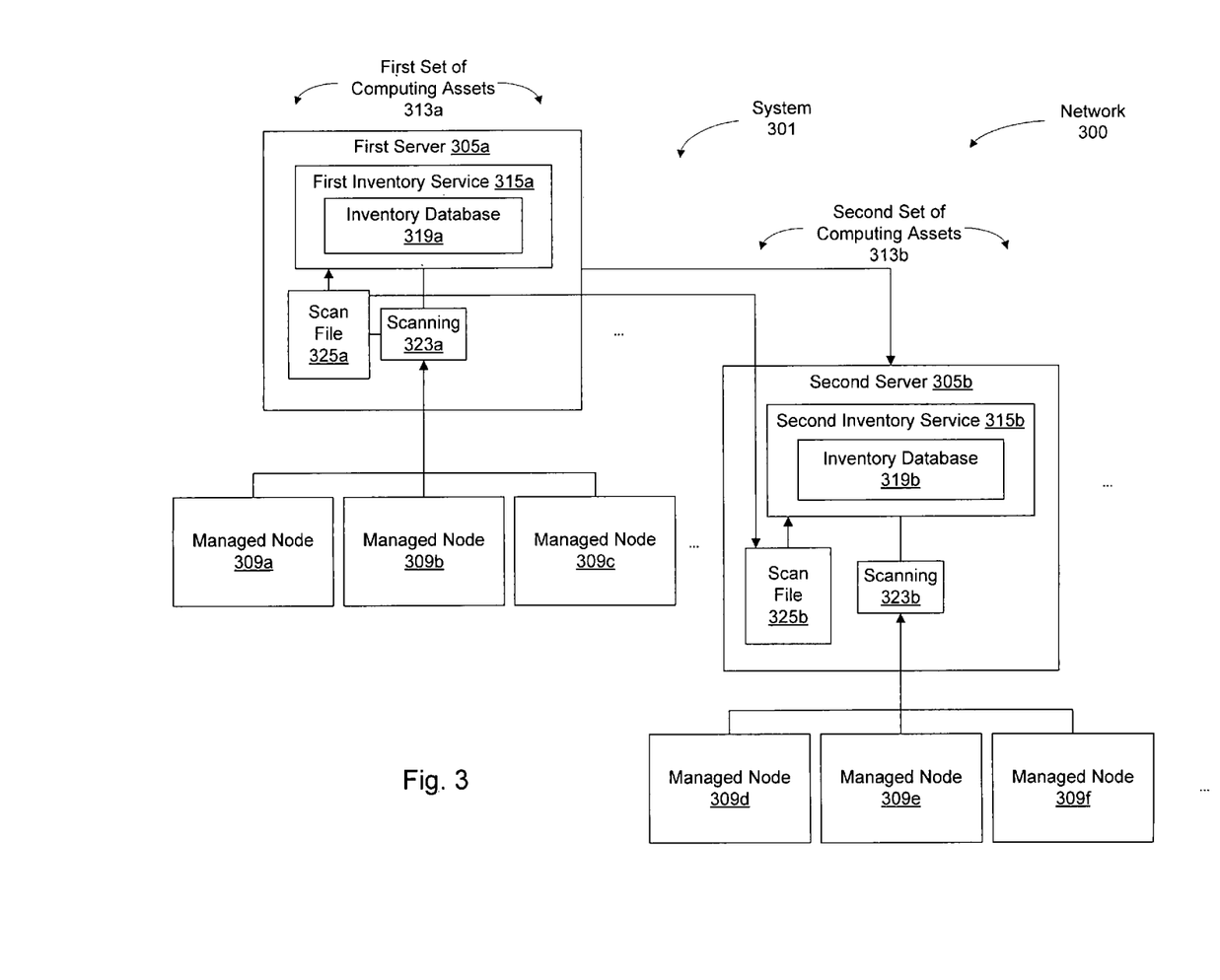
FIG. 3 is a block diagram illustrating a network including one embodiment of a system for updating distributed inventory services.

FIG. 3 is a block diagram illustrating a network 300 including one embodiment of a system 301 for updating distributed inventory services 315. As indicated above, the inventory services 315 may include an inventory database 319 and a scanning component 323 that compiles a scan file 325. The scanning component 323 may gather inventory data included within each database 319 from the pertinent server 305. Alternatively, the data may be gathered by managed nodes 309 using, for example, management agents 121 (shown in FIG. 1) or other software running on a managed node 309, which data is then transmitted to the server 305 for use by the inventory service 315. The techniques and methods used for gathering and creating scan files 325 outlined in connection with FIG. 2, may likewise be implemented in connection with FIG. 3.

Each server 305 is associated with, or manages, a particular set of computing assets 313. As illustrated in FIG. 3, the first server 305a is associated with a first set 313a of computing assets, and a second server 305b is associated with a second set 313b of computing assets. The first set 313a of computing assets, in one embodiment, may comprise a separate "network" within the greater network 300 than the second set 313b of computing assets. Alternatively, the first set 313a is a subnet within a network 300, and the second set 313b is a different subnet within the same network 300. In the illustrated embodiment, inventory data regarding the first set 313a of computing assets is gathered at the scan file 325a for the first server 305a. Thus, the scan file 325a shown in FIG. 3 contains updated information about computing assets within the first set 313a of computing assets.

The database file 325a for the first inventory service 315a is updated based on the scan file 325a. Thereafter, the scan file 325a is transmitted to the second server 305b. The inventory database 319b for the second inventory service 315b is then updated based on the scan file 325b, which may be a re-created version of the scan file 325a used in connection with the first inventory service 315a. "Transmission" of the scan file 325 may occur in a number of different ways. For example, the transmission control protocol ("TCP") transmission protocol may be utilized to transfer the scan file 325 data to other servers 305. Alternatively, a scan file 325 could be "posted" to a web service and be accessed by other servers 305.

Of course, if more than two servers 305 are present within the network 300, the scan file 325a may be transmitted to each of the servers 305 such that each of the inventory databases 319 may be updated in real-time. Likewise, scan files 325 for the second set 313b of computing assets 313b may be transmitted to the first server 305a for integration into the inventory database 319a associated with the first inventory service 315a, or other servers, if they are present.

After an initial scan is completed, subsequent scan files 325 may contain only incremental changes to the computing assets 313 within the network 300 or pertinent portion of the network 300. Accordingly, the scan files 325 will be relatively small and will not consume significant bandwidth during transmission to other servers 305. Accordingly, inventory services 315 may be maintained in an up-to-date condition without consuming significant network bandwidth.

The network 300 shown in FIG. 3, like the network shown in FIG. 1, may use various types of communication protocols and may be configured in various ways. For example, the network 300 may comprise a plurality of different types of networks, a single network, networks that are geographically remote from each other, or networks using various types of communication protocols or configurations. For example, the TCP/IP protocol may be used. In such a case, the system 301 may open a communication socket and transmit the scan file 325 as a series of TCP/IP packets to other inventory services 315 within the network 300.

The disclosed systems and methods provide substantial advantages over prior art embodiments. In prior embodiments, newly obtained inventory data was integrated into an inventory database. Thereafter, the entire inventory database containing the newly added data was "rolled up" into other databases distributed throughout the network. Transmitting the entire inventory database consumed significant network bandwidth. Accordingly, network administrators were prone to only periodically update inventory databases, forcing network administrators to rely on outdated inventory information. The systems and methods disclosed herein, in contrast, use only minimal network bandwidth, enabling real-time or near real-time updating of inventory databases.

Further, as will be explained below in connection with FIG. 6, in one embodiment, the inventory database management system is specially created for inventory systems and accordingly may be used to perform specialized inventory data gathering.

The network 300 shown in FIG. 3 is only illustrative and not limiting of the type of network 300 in which the systems and methods disclosed herein may be implemented. For example, the network 300 may include many different servers 305, not merely the two servers 305 shown in FIG. 3. Furthermore, the number of managed nodes 309 may also be varied.

Figure 4:
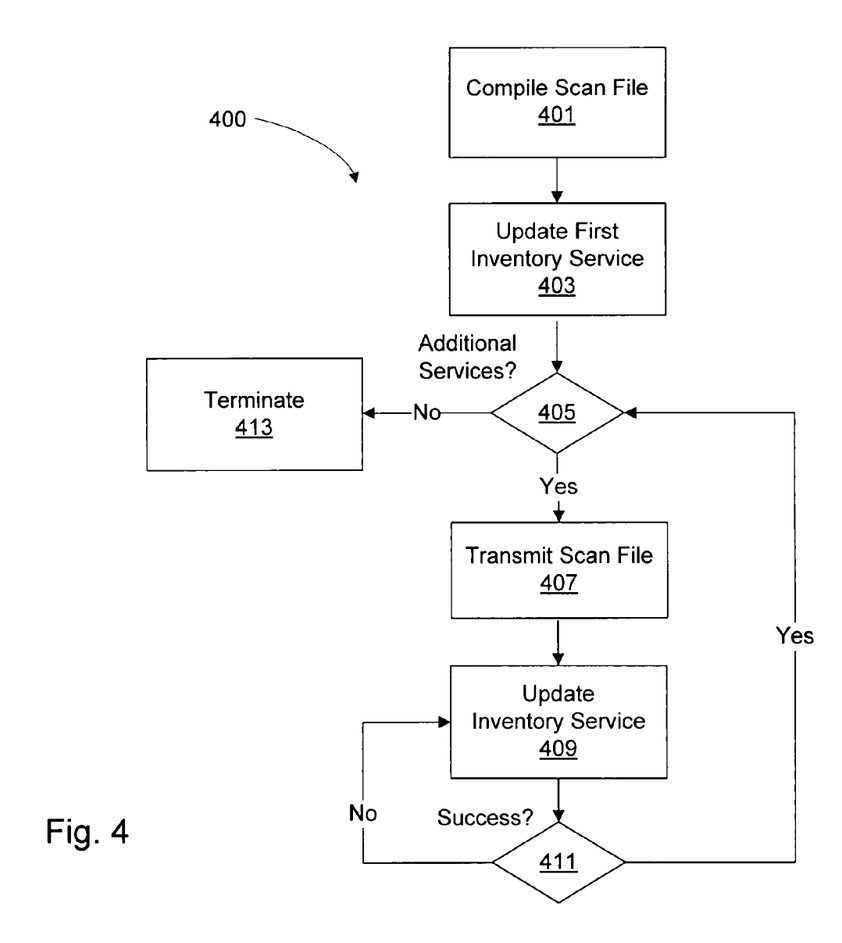
FIG. 4 is a flow diagram illustrating one embodiment of a method for updating distributed inventory services.

FIG. 4 is a flow diagram illustrating one embodiment of a method 400 for updating distributed inventory services. Following a scan, a scan file is compiled 401 containing full or incremental data for a network or a portion thereof. A first inventory service is then updated 403. It is then determined 405 whether there are additional inventory services within the network. If additional inventory services are present and known to the pertinent server, a scan file is transmitted 407 to one or more of the inventory services. Each inventory service is then updated 409.

Upon successful update 411 of an inventory service, it is then determined 405 whether there are additional inventory services present and visible that have not been updated. If additional services are present and have not been updated, the scan file is transmitted 407 and then the pertinent inventory service is updated 409. When no more additional inventory services are present, the process is terminated 413. Using this simple but highly effective method, inventory services may be rapidly updated to contain the most recent inventory information.

Within the scope of the disclosed systems and methods, various distribution techniques may be used. For example, a single server may distribute 407 the scan files to multiple servers. Alternatively, each server will forward the scan file 407 to only one other server until all inventory services have been updated.

Figure 5:
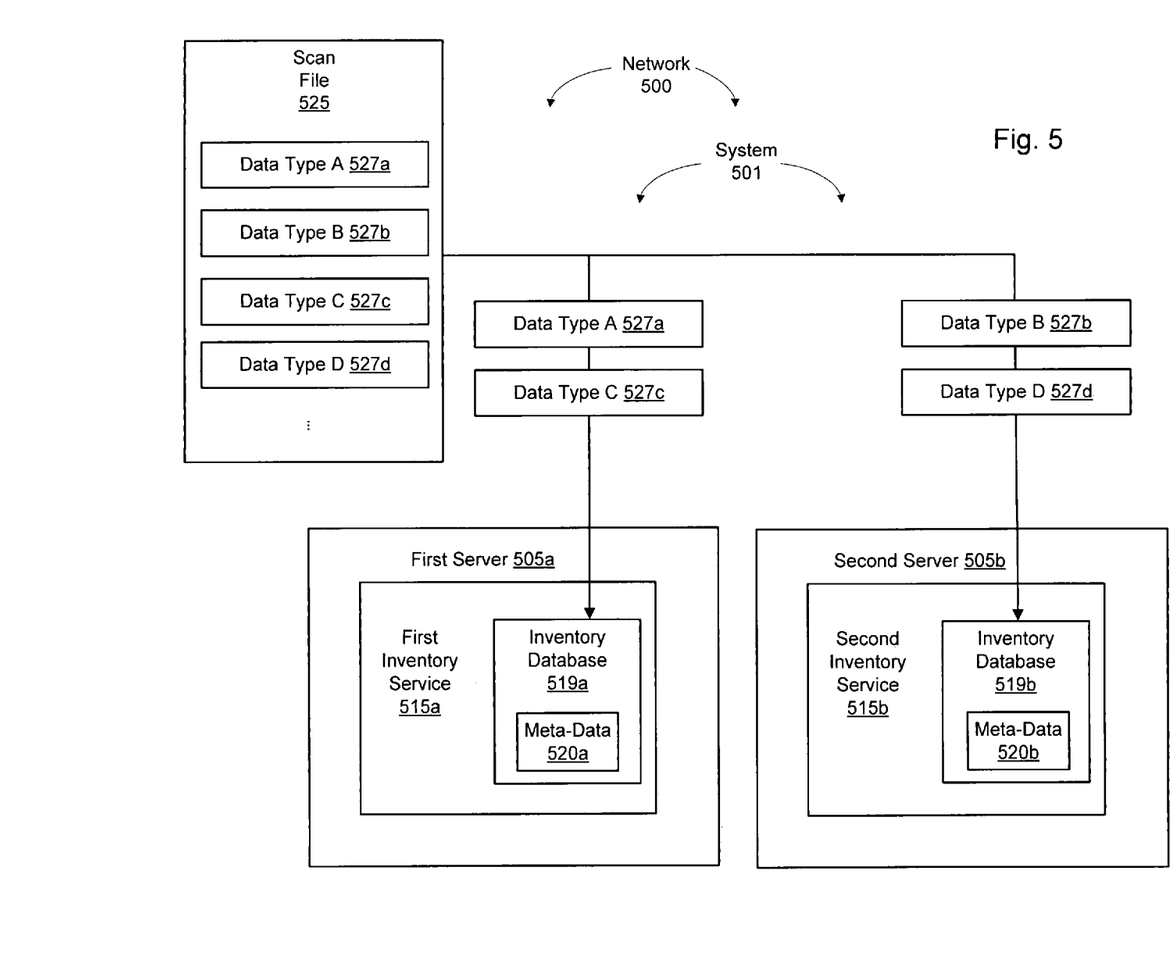
FIG. 5 is a block diagram illustrating a network that includes one embodiment of a system for selectively updating distributed inventory services.

FIG. 5 is a block diagram illustrating a network 500 having one embodiment of a system 501 for selectively updating distributed inventory services 515. For simplicity, managed nodes within the network 500 are not shown.

As explained above, a scan file 525 may be created that contains complete or incremental inventory data for a network 500 or a portion thereof. The scan file 525 may contain different categories or types of data, such as software and hardware inventory data. Additional types of data may exist, such as security software data (e.g., anti-virus or anti-spyware software), application software data (e.g., Microsoft® Word), desktop maintenance software data (e.g., Norton Utilities), CPU data, RAM data, BIOS data, or hard disk data.

The system 501 disclosed in FIG. 5, provides for selective updating of distributed inventory services 515 at different servers 505 as the scan file 525 is transmitted and used to update these inventory services 515. For example, as illustrated, data type A 527a and data type C 527c are stored in the first inventory service 515a, while data type B and data type D 527b, 527d are stored in the second inventory service 515b. Data types B and D 527b, 527d are not stored in the first inventory service 515a, and data type A and C 527a, 527c are not stored in the second inventory service 515b. In an alternative embodiment, one or more of the servers 505 within the network 500 are updated to include all data types 527a-d, while other servers 505 may include only select data types.

In one embodiment, each inventory database 519a-b includes meta-data 520a-b that determines which types of inventory data types 527a-d will be stored in a particular database 519a-b. Of course, alternative methods for determining which types of data 527a-d are stored at each database 519a-b may be used.

Selectively updating distributed inventory services 515 can provide significant administrative advantages. For example, certain types of data 527 may be more securely maintained than other types of data 527. Using the illustration shown in FIG. 5, if data types A and C 527a, 527c involve information that the system administrator wishes to maintain in confidence, access to the first inventory service 515 may be controlled by providing limited access rights to the first server 505 or the first inventory service 515.

Another advantage of selectively updating distributed inventory services 515 is that storage capacity is conserved. All data types 527a-d do not need to be saved on all servers 505. The disclosed system 501 thus enables system administrators to tailor the inventory management system according to available storage space and pertinent security needs.

The network 500 shown in FIG. 5 is only illustrative and not limiting of the type of network 500 in which the systems and methods disclosed herein may be implemented. For example, the network 500 may include many different servers 505, not merely the two servers 505 shown in FIG. 5.

Figure 6:
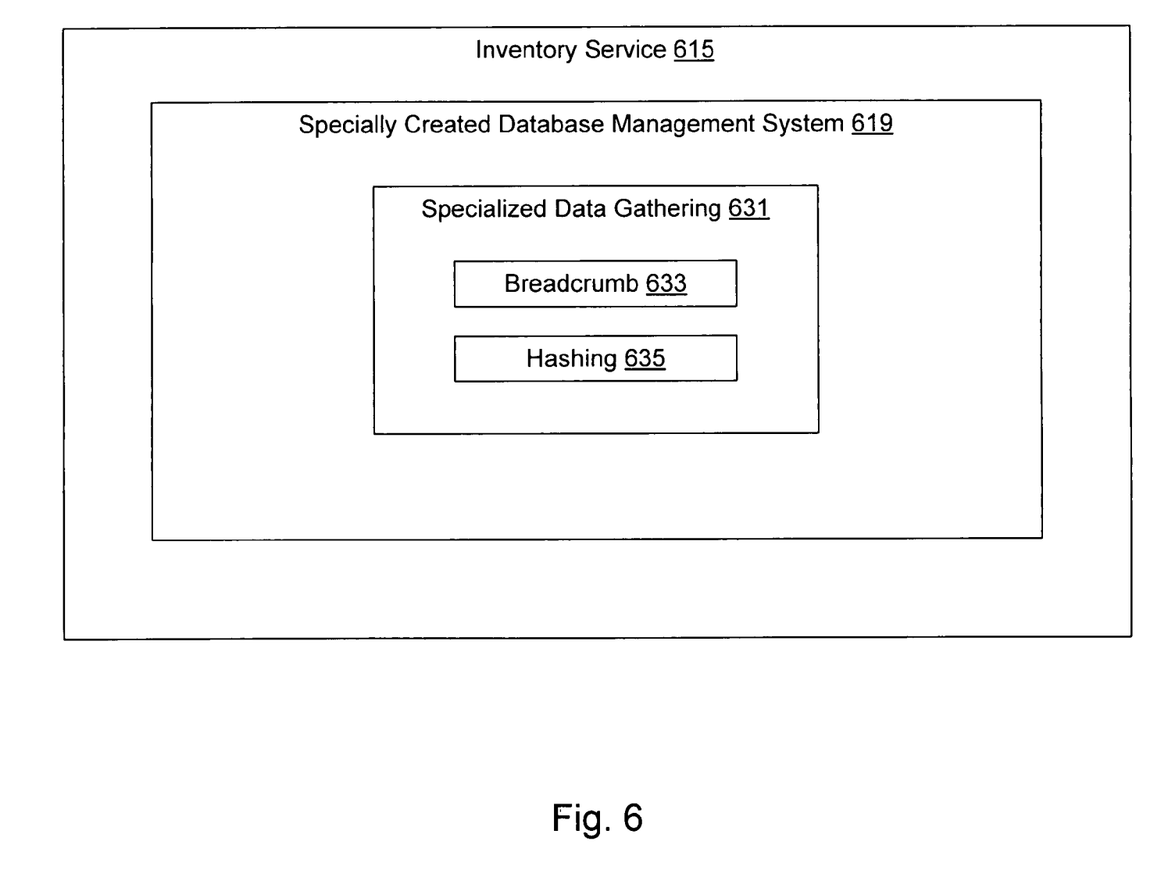
FIG. 6 is a block diagram illustrating one embodiment of an inventory service having a specially created database management system.

FIG. 6 is a block diagram illustrating one embodiment of an inventory service 615 having a specially created database management system 619. The specially created database management system 619 is a database management system created and specifically tailored for use with an inventory service 615. As indicated above, the inventory service 615 may comprise a portion of a management application 117, which is illustrated in FIG. 1. Alternatively, the inventory service 615 may be an independent application that can optionally interact with a management application 117 or a management agent 121 (shown in FIG. 1).

The specially created database management system enables specialized data gathering. For example, in one embodiment, the specialized data gathering may include a "breadcrumb" 633 feature that enables hashing 635, or categorizing, of the inventory data for a particular node 309 according to the server 309 associated with the particular node 309. Accordingly, jobs or tasks to be performed may be pushed directly to the node 309 itself or to the administrator of the server 305 associated with the node 309.

Figure 7:
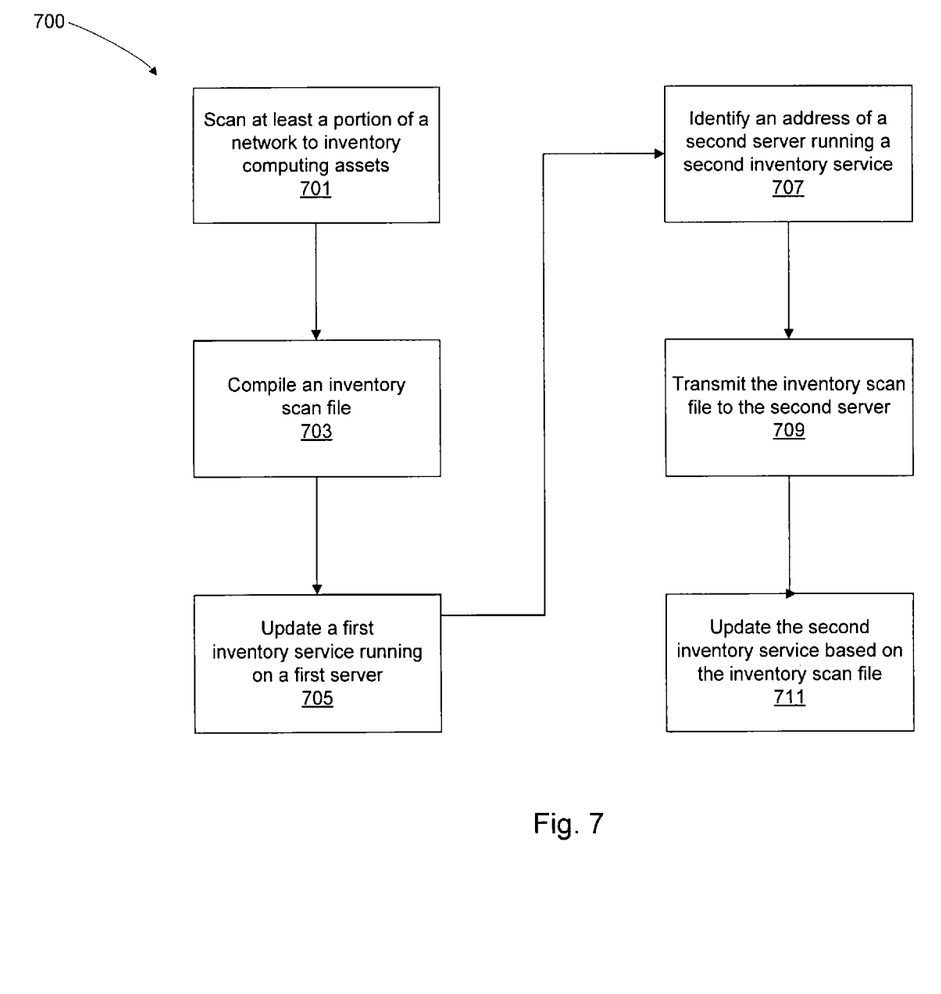
FIG. 7 is a flow diagram illustrating one embodiment of a method for updating distributed inventory services.

FIG. 7 is a flow diagram illustrating one embodiment of a method 700 for updating distributed inventory services. At least a portion of a network 300 may be scanned 701 to inventory computing assets 313 therein. As indicated above, scanning may be performed by a scanning component 323 that is integrated with or distinct from an inventory service 315, 515 and which may operate on a server 305, 505 and/or individual nodes 309.

Thereafter, an inventory scan file 325, 525 is compiled 703 that reflects at least one computing asset within the scanned portion of the network. The scan file 325, 525 may include incremental or full data regarding, for example, hardware and software assets within the scanned portion of the network.

Thereafter, a first inventory service running on a first server is updated 705 based on the inventory scan file. The inventory service may incorporate all the data from the scan file, as explained in connection with FIGS. 2-3, or may selectively update data from the scan file, as explained in connection with FIG. 5. When selective updating of inventory services is performed, only certain types of hardware or software data, for example, may be added to the pertinent inventory service.

An address of a second server running a second inventory service is identified 707. This identification may occur at various stages and multiple servers or a single server may be identified. For example, at the most recent boot up of the first server, servers running inventory services may be identified 707. Alternatively, identification 707 of pertinent servers may be performed before, after, or concurrent with compilation 703 of a scan file.

Using the identified address, the scan file is transmitted 709 to the second server. Thereafter, the second inventory service is updated 711 based on the inventory scan file. Again, the updating process may involve all the data or only selected types of data within the scan file. In an embodiment where many servers are utilized, the scan file may be transmitted to each one of the servers.

In one embodiment, where selective updating is utilized, confidential information may be stored and updated on particular inventory services on specific servers. Access to those servers or inventory services may be limited to protect the information from disclosure. Additionally, selective updating procedures may be used to minimize storage space required for inventory services by, for example, storing only hardware inventory data on one server and only software inventory data on another server.

As explained in connection with FIG. 6, inventory services may utilize a specially created database management system 619 to perform specialized data gathering 631, such as a breadcrumb procedure 633 that utilizes hashing 635 to categorize nodes associated with the particular server.

Figure 8:
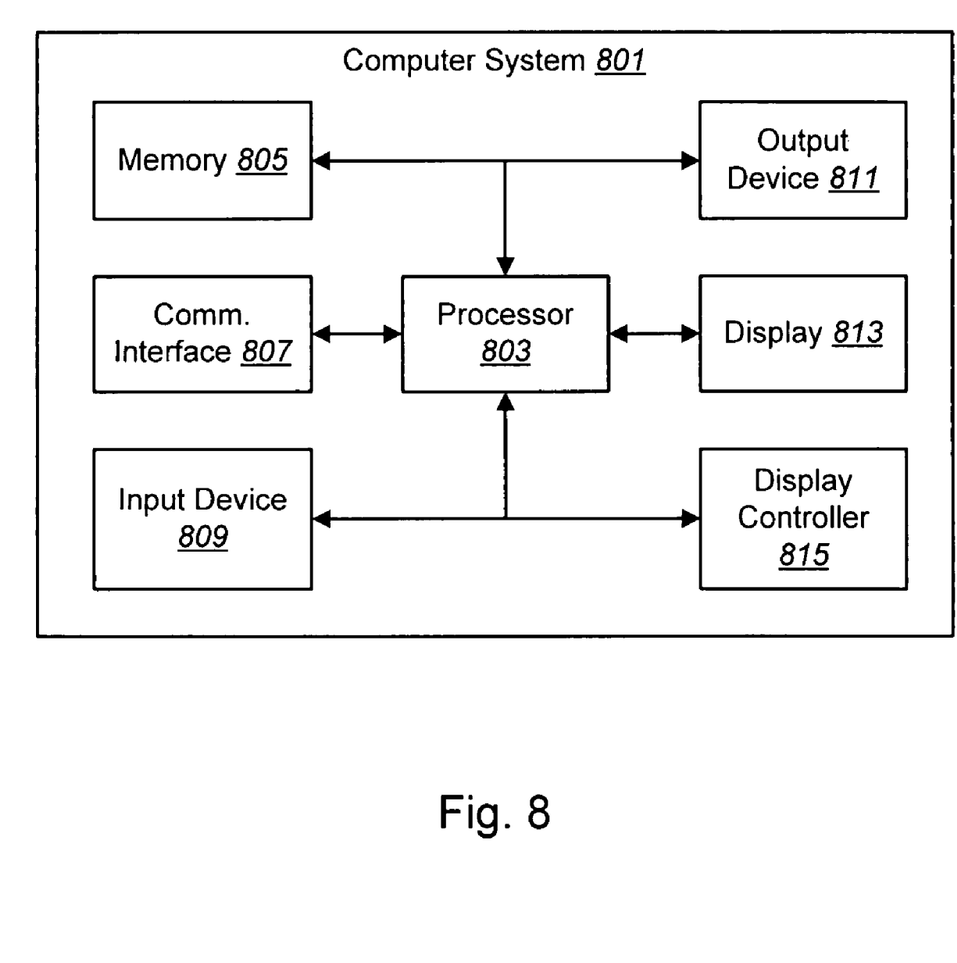
FIG. 8 is a block diagram illustrating the major hardware components typically utilized in a computer system.

FIG. 8 is a block diagram illustrating the major hardware components typically utilized in a computer system 801, which may comprise a node or server as disclosed herein. The illustrated components may be located within the same physical structure or in separate housings or structures.

The computer system 801 includes a processor 803 and memory 805. The processor 803 controls the operation of the computer system 801 and may be embodied as a microprocessor, a microcontroller, a digital signal processor (DSP) or other device known in the art. The processor 803 typically performs logical and arithmetic operations based on program instructions stored within the memory 805.

As used herein, the term memory 805 is broadly defined as any electronic component capable of storing electronic information, and may be embodied as read only memory (ROM), random access memory (RAM), magnetic disk storage media, optical storage media, flash memory devices in RAM, on-board memory included with the processor 803, EPROM memory, EEPROM memory, registers, etc. The memory 805 typically stores program instructions and other types of data. The program instructions may be executed by the processor 803 to implement some or all of the methods disclosed herein.

The computer system 801 typically also includes one or more communication interfaces 807 for communicating with other electronic devices. The communication interfaces 807 may be based on wired communication technology, wireless communication technology, or both. Examples of different types of communication interfaces 807 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 801 typically also includes one or more input devices 809 and one or more output devices 811. Examples of different kinds of input devices 809 include a keyboard, mouse, microphone, remote control device, button, joystick, trackball, touchpad, lightpen, etc. Examples of different kinds of output devices 811 include a speaker, printer, etc. One specific type of output device which is typically included in a computer system is a display device 813. Display devices 813 used with embodiments disclosed herein may utilize any suitable image projection technology, such as a cathode ray tube (CRT), liquid crystal display (LCD), light-emitting diode (LED), gas plasma, electroluminescence, or the like. A display controller 815 may also be provided, for converting data stored in the memory 805 into text, graphics, and/or moving images (as appropriate) shown on the display device 813.

Of course, FIG. 8 illustrates only one possible configuration of a computer system 801. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for updating distributed inventory services that enumerate computing assets within a computer network, comprising:

scanning a first portion of a network to inventory computing assets within the first portion of the network;

compiling a first inventory scan file that reflects at least one computing asset within the first portion of the network, wherein after an initial scan, the first inventory scan file includes only incremental data about changes in the software or hardware configuration of the computing assets since a last scan was performed;

updating a first inventory service running on a first server based on the first inventory scan file;

identifying an address of a second server running a second inventory service, the first and second server each managing one or more computing assets;

transmitting the first inventory scan file to the second server;

receiving, by the first server, a second inventory scan file from the second server, the second inventory scan file being compiled to reflect a second computing asset within a second portion of the network, wherein the second inventory scan file includes only incremental data about changes in the software or hardware configuration of the second computing asset since a last scan was performed; and updating the first inventory service on the first server based on the second inventory scan file, wherein the first and second servers have selective updating to store specific data types from the first and second scan files, wherein a first data type is stored on the first server and a second data type is stored on the second server, wherein the first server receives the second data type from either the first scan file or the second scan file but does not store the second data type, and wherein the second server receives the first data type from either the first scan file or the second scan file but does not store the first data type, wherein at least one of the first and second inventory services comprises a database management system created specifically for inventory services to enable specialized inventory data gathering, wherein the specialized inventory data gathering technique comprises a breadcrumb feature that identifies which server is associated with a particular computing asset, and further comprises a hashing function that groups computing assets according to the server which is associated with each asset.

2. The method of claim 1, wherein the first inventory service comprises a first type of data.

3. The method of claim 2, wherein the first type of data comprises an inventory of software computing assets.

4. The method of claim 2, wherein the first type of data comprises an inventory of hardware computing assets.

5. The method of claim 2, wherein the second inventory service comprises a second type of data.

6. The method of claim 5, further comprising limiting access to the second inventory service.

7. The method of claim 1, wherein the first server is associated with a first set of computing assets, and the second server is associated with a second set of computing assets.

8. A system for updating distributed inventory services that enumerate computing assets within a computer network, comprising:

a first and a second server in electronic communication with each other, wherein the servers comprise a computer-readable medium that is part of the servers or is in electronic communication with the servers, the computer-readable medium comprising instructions for updating a first inventory service running on the first server and a second inventory service running on the second server, the instructions being executable to:

scan a first portion of a network to inventory computing assets within the first portion of the network;

compile a first inventory scan file that reflects at least one computing asset within the first portion of the network, wherein after an initial scan, the first inventory scan file includes only incremental data about changes in the software or hardware configuration of the computing asset since a last scan was performed;

update the first inventory service running on the first server based on the first inventory scan file;

identify an address of the second server, the first and second server each managing one or more computing assets;

transmit the first inventory scan file to the second server;

receiving, by the first server, a second inventory scan file from the second server, the second inventory scan file being compiled to reflect a second computing asset within a second portion of the network, wherein the second inventory scan file includes only incremental data about changes in the software or hardware configuration of the second computing asset since a last scan was performed; and updating the first inventory service on the first server based on the second inventory scan file, wherein the first and second servers have selective updating to store specific data types from the first and second scan files, wherein a first data type is stored on the first server and a second data type is stored on the second server, wherein the first server receives the second data type from either the first scan file or the second scan file but does not store the second data type, and wherein the second server receives the first data type from either the first scan file or the second scan file but does not store the first data type, wherein at least one of the first and second inventory services comprises a database management system created specifically for inventory services to enable specialized inventory data gathering, wherein the specialized inventory data gathering technique comprises a breadcrumb feature that identifies which server is associated with a particular computing asset, and further comprises a hashing function that groups computing assets according to the server which is associated with each asset.

9. The system of claim 8, wherein the first inventory service comprises a first type of data.

10. The system of claim 9, wherein the second inventory service comprises a second type of data.

11. The system of claim 10, wherein the instructions are further executable to limit access to the second inventory service.

12. A non-transitory computer-readable medium comprising executable instructions for updating distributed inventory services that enumerate computing assets within a computer network, the instructions being executable to:

scan a first portion of a network to inventory computing assets within the first portion of the network;

compile a first inventory scan file that reflects at least one computing asset within the first portion of the network, wherein after an initial scan, the first inventory scan file includes only incremental data about changes in the software or hardware configuration of the computing asset since a last scan was performed;

update a first inventory service running on a first server based on the first inventory scan file;

identify an address of a second server running a second inventory service;

transmit the first inventory scan file to the second server, the first and second server each managing one or more computing assets;

receive, by the first server, a second inventory scan file from the second server, the second inventory scan file being compiled to reflect a second computing asset within a second portion of the network, wherein the second inventory scan file includes only incremental data about changes in the software or hardware configuration of the second computing asset since a last scan was performed; and update the first inventory service on the first server based on the second inventory scan file, wherein the first and second servers have selective updating to store specific data types from the first and second scan files, wherein a first data type is stored on the first server and a second data type is stored on the second server, wherein the first server receives the second data type from either the first scan file or the second scan file but does not store the second data type, wherein the second server receives the first data type from either the first scan file or the second scan file but does not store the first data type, wherein at least one of the first and second inventory services comprises a database management system created specifically for inventory services to enable specialized inventory data gathering, wherein the specialized inventory data gathering technique comprises a breadcrumb feature that identifies which server is associated with a particular computing asset, and further comprises a hashing function that groups computing assets according to the server which is associated with each asset.

13. The non-transitory computer-readable medium of claim 12, wherein the first inventory service comprises a first type of data.

14. The non-transitory computer-readable medium of claim 13, wherein the second inventory service comprises a second type of data.

15. The non-transitory computer-readable medium of claim 14, the instructions are further executable to limit access to the second inventory service.

16. The non-transitory computer-readable medium of claim 12, wherein at least one of the first and second inventory services comprises a database management system created specifically for inventory services to enable specialized inventory data gathering.

* * * * *

UNITED STATES PATENT AND TRADEMARK OFFICE
CERTIFICATE OF CORRECTION

| | | |
|---|---|---|
| PATENT NO. | : 8,150,961 B1 | Page 1 of 1 |
| APPLICATION NO. | : 11/289130 | |
| DATED | : April 3, 2012 | |
| INVENTOR(S) | : Mark Bird et al. | |

It is certified that error appears in the above-identified patent and that said Letters Patent is hereby corrected as shown below:

On the Title page, Item (56), under "References Cited" please add -- 6,973,491 --.

In column 3, lines 41-42 please delete "and/or transmitted as electronic signals over a system bus or network.".

Signed and Sealed this
Sixteenth Day of October, 2012

David J. Kappos
*Director of the United States Patent and Trademark Office*